United States Patent [19]

Bonacci

[11] Patent Number: 4,577,539
[45] Date of Patent: Mar. 25, 1986

[54] APPARATUS FOR CUTTING SHEETS OF PLATE GLASS ACCORDING TO A PROGRAMMED PROFILE

[75] Inventor: Carlo Bonacci, Leghorn, Italy
[73] Assignee: Societa Italiana Vetro SIV S.p.A., Vasto, Italy
[21] Appl. No.: 609,688
[22] Filed: May 14, 1984
[30] Foreign Application Priority Data May 12, 1983 [IT] Italy .............................. 48284 A/83

[51] Int. Cl.⁴ .............................................. C03B 33/04
[52] U.S. Cl. ........................................ 83/886; 83/71; 83/155; 83/157; 83/437; 83/925 CC; 225/96
[58] Field of Search .................. 83/71, 879, 880, 886, 83/887, 925 CC, 155, 157, 437; 225/96

[56] References Cited

U.S. PATENT DOCUMENTS

| | | | |
|---|---|---|---|
| 3,522,753 | 8/1970 | Schmied | 83/71 X |
| 3,548,697 | 12/1970 | Gerber et al. | 83/925 CC |
| 3,555,944 | 1/1971 | Imamura | 83/886 |
| 4,070,890 | 1/1978 | Stubbings | 83/71 X |
| 4,171,657 | 10/1979 | Halberschmidt et al. | 83/71 X |
| 4,391,170 | 7/1983 | Boverman et al. | 83/71 |

Primary Examiner—Frank T. Yost
Attorney, Agent, or Firm—Browdy and Neimark

[57] ABSTRACT

Apparatus for cutting sheets of plate glass, particularly for making automobile windows, according to a profile programmed in a digital control unit the control output of which is coupled to electrohydraulic amplifiers, each of which controls the movements of a hydrodynamic cylinder moving on a fixed piston rod. A cutting head is fixed to one of the cylinders, while a table to bring the sheet of glass to be cut into contact with the cutting head is fixed to the other cylinder. The two cylinders move in perpendicular directions, and their coordinated movements cause the glass to be cut in a programmed profile. A belt conveyor is incorporated in the machine to carry the glass to the table, and may assume a raised position for transport and a lowered position at rest (FIG. 1).

6 Claims, 6 Drawing Figures

APPARATUS FOR CUTTING SHEETS OF PLATE GLASS ACCORDING TO A PROGRAMMED PROFILE

BACKGROUND OF THE INVENTION

The present invention relates to a machine for automatic cutting of sheets of plate glass, for drawing by incision figures with closed profiles, particularly mixed line profiles with trapezoid or rhombus shapes particularly suited for automobile windows.

The apparatus is controlled by a digital control system in which the profile to be cut is memorized.

DESCRIPTION OF THE PRIOR ART

Devices are known for cutting sheets of plate glass in which the incision tool is guided by a template which supplies the information for the shape of the profile.

The present invention does not use such templates, but rather uses an electronic system in which the shape of the profile is memorized point by point through its geometric coordinates.

In the prior art, devices are known for automatic cutting of sheets of plate glass which do not use templates and which use programmed cutting systems.

For example, the German patent 2646062 describes a digitally controlled cutting machine in which the tool-bearing cart is supported by bars which are perpendicular to one another, which form the movement in the plane of the cart. Motion is transmitted through a timing belt, controlled by electric motors. In this patent, the emphasis is on reducing the size of the parts in motion to allow greater cutting speeds than those achieved in other numerically controlled machines.

German patent 2646053 describes a control circuit for a cutting machine of the type described in German patent 2646062 cited above, in which the cutting parameters are memorized on magnetic tape and then transmitted to the cutting tool. Published European patent application No. 0011238 shows that in an apparatus of this type the timing belt transmission often leads to errors in precision, due to the inevitable stretching of the belts themselves. According to this European application, the problem may be overcome by using a system for reading the trajectory of the cut which uses pulse counters on the X and Y axes with the possibility of recovering the allowances of the timing belts by means of conical or other diameter propulsion rollers.

Therefore, the principle technical problems which arise in the field of digital control cutting machines for glass are the following:

(a) poor correspondence between the signal from the control unit and the trajectory traced by the cutting tool due to deformation or allowances of the transmissions used in the previous techniques;

(b) excessive mass in motion, which generates a centrifugal force on the cutting wheel, so that high speeds cannot be reacted in the curved sections of the trajectory.

SUMMARY OF THE INVENTION

The present invention resolves both of the problems cited above with an apparatus for cutting sheets of plate glass with a digital control unit, in which the centrifugal force to which the tool-bearing cart and the cutting wheel carried on it are subjected is eliminated or reduced to a minimum, by reducing to the minimum the mass of the tool-bearing cart in motion and by making said cart move on a purely rectilinear trajectory, so that the cutting wheel does not have to follow curved trajectories which generate centrifugal forces transverse to the trajectory to be followed.

Another aim of the present invention is to provide a cutting apparatus which allows precise correspondence between the signal transmitted by the control unit and the trajectory traced, by means of using electrohydraulic amplifiers which supply the control unit with a feed back information to verify said correspondence.

In this way, according to the present invention, an apparatus is realized for cutting sheets of plate glass which operates at high velocity and high precision and so allows elevated production at elevated quality.

According to the invention the cutting tool moves according to a rectilinear trajectory, carried by a hydrodynamic device in which the piston rod is fixed and the cylinder runs along it. In this way the mass in motion is greatly reduced since it involves no mechanical transmission, and the inertial forces are reduced to those which act along one axis only, completely eliminating those which would otherwise act in a direction perpendicular to said axis and so eliminating in fact one of the components which contribute to the development of centrifugal forces.

If the axis along which the cutting head moves is indicated with X, the component of the motion along an axis perpendicular to it, called the Y axis, is supplied by the movement (also obtained by means of an hydrodynamic transmission, in which the mobile element is the cylinder of an hydrodynamic piston and cylinder complex) of a table bearing the sheet to be cut and joined to said cylinder which moves in the direction of the Y axis. The combination of the two movements allows all the desired cutting profiles to be achieved.

The hydraulic transmission at the same time resolves the problem of the precise correspondence between the control signal transmitted and the trajectory traced. To this end, according to the invention a system is used comprising two electrohydraulic amplifiers, coupled to the cylinders with fixed rod and mobile cylinder, which are equipped with a precision rack joined to each cylinder which is engaged with a pinion gear which is part of the electrohydraulic amplifier; with its position the pinion gear supplies exact information on the position of the rack and thus th cylinder, and allows said information to be sent to the digital control device which operates the motor of said electrohydraulic amplifier, while verifying the real position of the trajectory to the control device. The apparatus according to the present invention allows the cutting operation to be performed with tolerances less than ±0.1 mm and with cutting speeds previously unattainable with systems using the previous techniques.

The digital control which controls the whole machine is such that no matter what the length of the programmed section, it is effected continuously, with no stops, so as to allow a cut which makes regular removal possible.

The apparatus according to the present invention is moreover characterized by a conveyor system for the sheets of glass to be cut comprising a belt conveyor which can assume a raised position during the transport operation and a lowered position during the cutting operation, so as not to interfere with the latter. This conveyor system is connected to the chassis of the machine by means of a parallel linkage mechanical system controlled automatically in coordination with the cutting operation.

DESCRIPTION OF THE DRAWINGS

The present invention will be better illustrated with reference to the attached drawings, in which.

THE DETAILED DESCRIPTION

Figure 1:
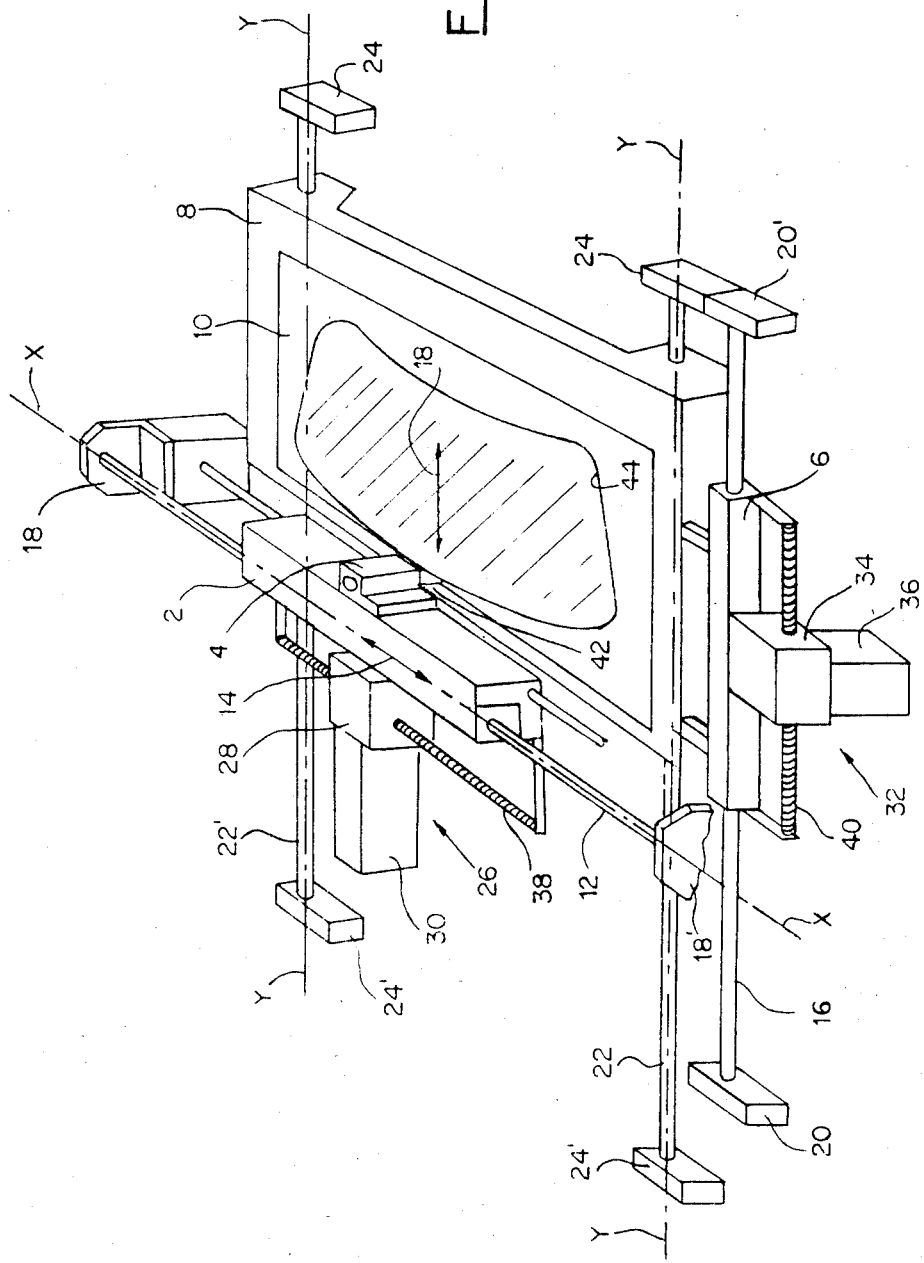
FIG. 1 is a schematic representation of the apparatus.

FIG. 1 shows a simplified view of the cutting apparatus according to the present invention. The X—X and Y—Y axes shown as dashed lines represent the displacement directions respectively of a first hydraulic cylinder 2 for the cutting head 4 and a second hydraulic cylinder 6 for the table 8, the upper surface of which comprises the cutting plane and supports the glass 10.

Cylinder 2 is coupled hydraulically with a first piston rod 12 equipped with a piston head (not shown). Cylinder 2 thus moves back and forth in the direction of the X axis as shown by arrow 14.

Cylinder 6 is analogously coupled with a rod 16 equipped with a piston head (not shown), so that cylinder 6 can move back and forth in the direction of the Y axis, pulling the table with it, as shown by arrow 18.

Rod 12 is fixed to supports 18, 18' integral to the chassis, and rod 16 is analogously fixed to supports 20, 21' integral to the chassis. Table 8 slides on guide bars 22,22' in the direction of the Y axis, the guide bar 22 being fixed to supports 24,24' integral to the chassis.

The movement of cylinder 2 is controlled by the electrodynamic amplifier 26 integral to the chassis, and comprises a regulator 28 and a step motor 30. In an analogous fashion cylinder 6 is controlled by an electrohydraulic amplifier 32 integral to the chassis, and comprises a regulator 34 and a step motor 36.

Amplifiers 26 and 32 are controlled by a digital control unit (not shown) which sends electrical pulses to the two motors, produced by an incremental or absolute program system in which the profile of the desired cut is memorized.

A rack 38 fixed to cylinder 2, and another rack 40 fixed to cylinder 6 are coupled with respective regulators 28 and 34 so as to establish a biunivocal correspondence between the position of regulators 28,34 controlled by respective motors 30,36 and that of the respective cylinders 2 and 6, so that the digital control unit is provided with information regarding the actual position of the cylinders to be compared with the pre-established program of displacements.

It should be noted that the trajectory of the cutting wheel 42 of the cutting head 4 is purely rectilinear, and that the mass in motion consists only of the cylinder and the cutting head 4 itself. Therefore, the mass connected to the cutting wheel 42 which is sensitive to the effect of inertia is greatly reduced, and furthermore the hydraulic transmission ensures that the mechanical components do not wear with time and so make the cutting operation less exact. Through regulator 28 and rack 38, the hydraulic transmission system supplies the control unit with very precise information on the effective position of the cutting wheel 42. This allows operation at high speeds, but with great precision, so that the glass 10 is cut into a profile 44 with high precision, velocity and repeatability.

The electrohydraulic amplifiers 26,32 are devices of a known type. They consist of a step motor which uses a ball circulation screw to control a hydraulic slide valve which can shift four valves to allow variation of the quantity of fluid in the two cylinder chambers and consequent displacement of the cylinder along its axis. The displacement of the slide valve rotates a pinion gear which engages a precision rack. The electrohydraulic amplifiers in normal use are however of the fixed cylinder and mobile shaft type, and the rack is fixed to the mobile shaft, placed inside the shaft itself. However, the amplifiers used in the present invention have a mobile hydraulic cylinder and a fixed shaft, so that the rack which must always be engaged with the rotating pinion gear is connected to the mobile cylinder, as will be illustrated in greater detail below.

Figure 2:
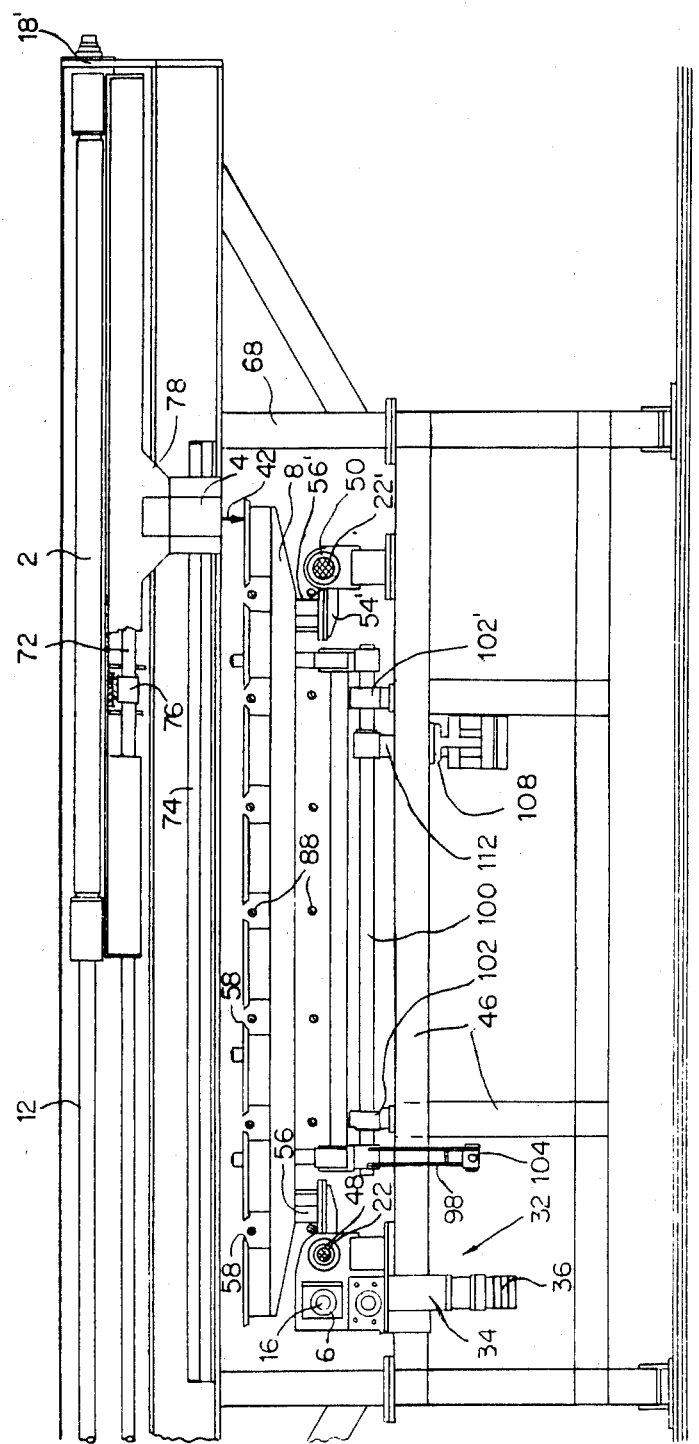
FIG. 2 is a raised side view of an embodiment of the apparatus according to the invention, with the cutting head in a front view and the hydraulic group for moving the table in a side view.
Figure 3:
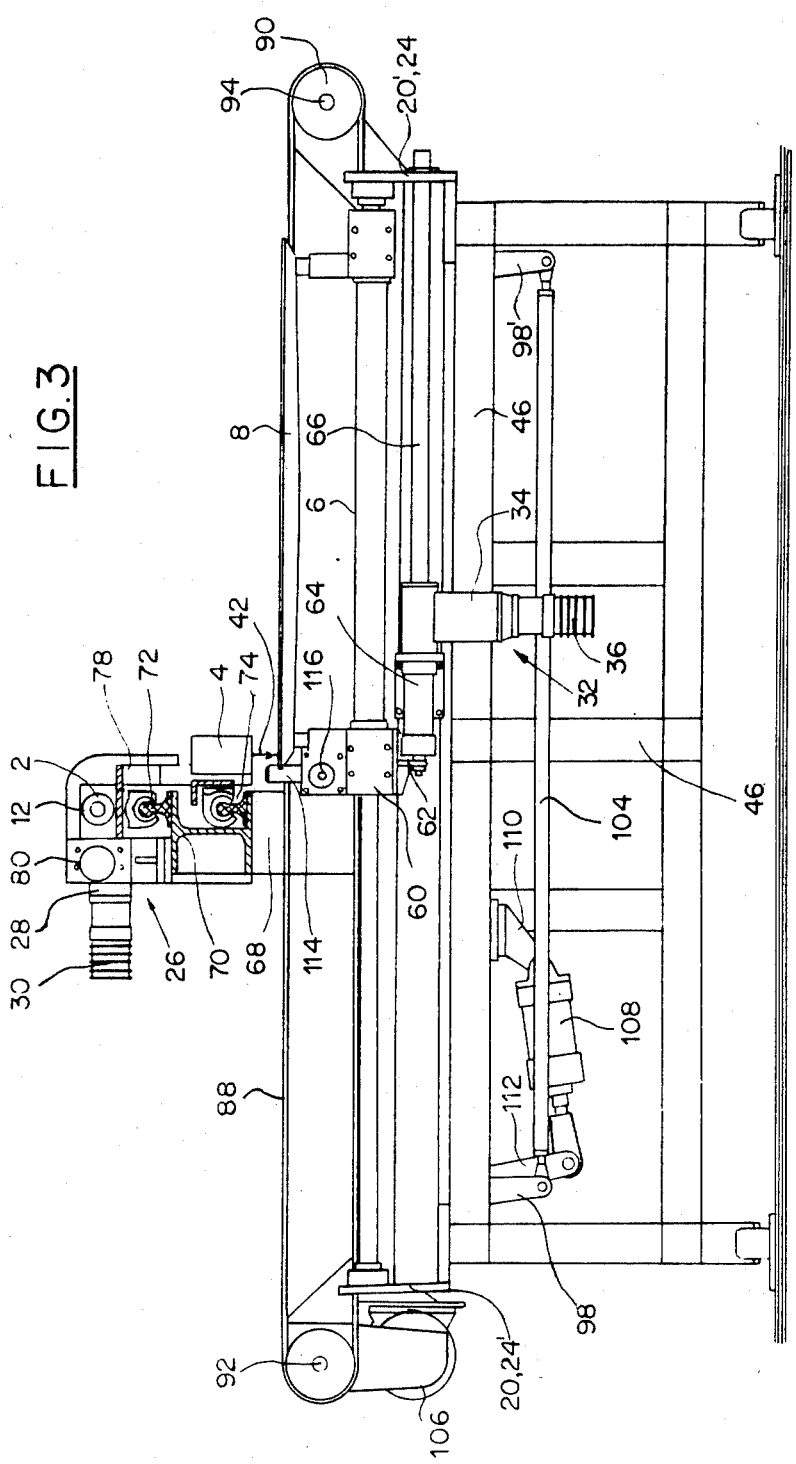
FIG. 3 is a raised side view analogous to that in FIG. 2 with the hydraulic system for moving the table in a rear view and the group for moving the cutting head in a side view.
Figure 4:
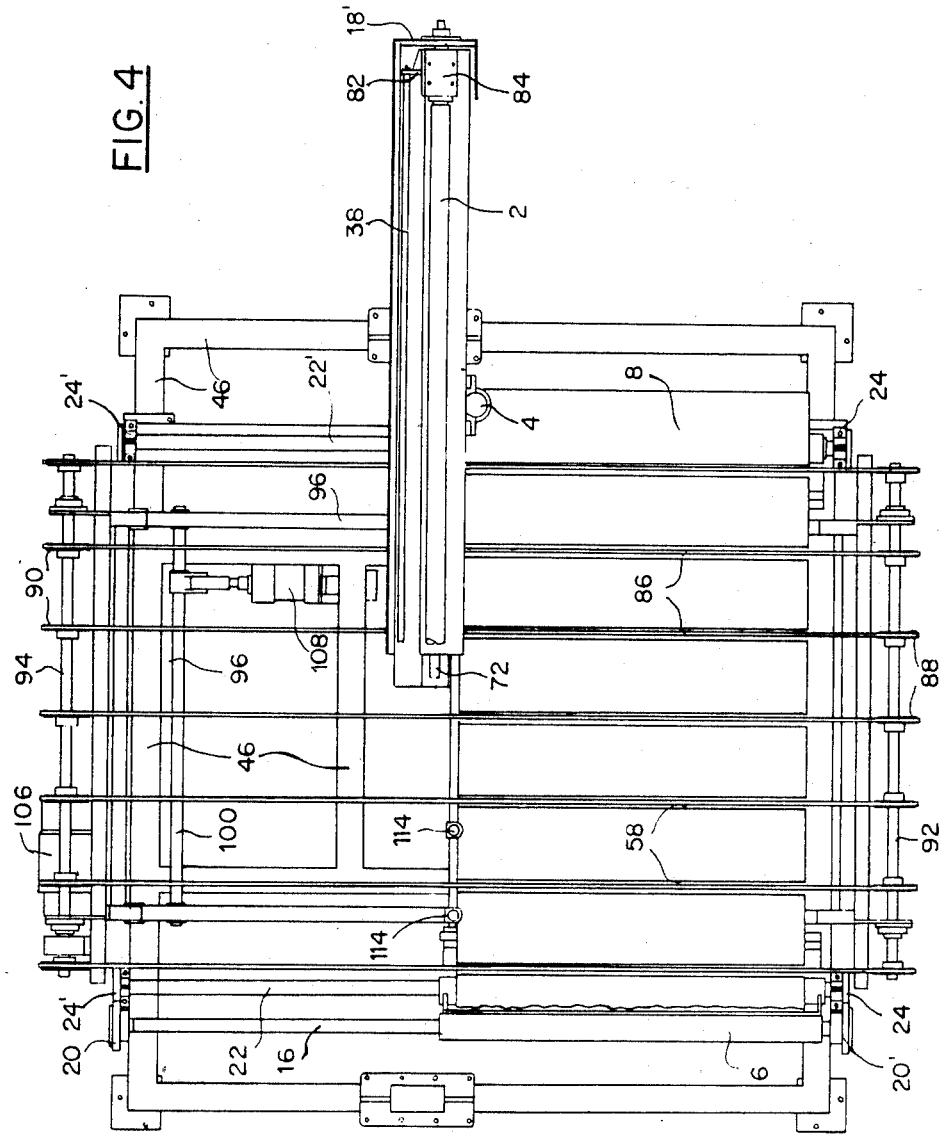
FIG. 4 is a top view of the apparatus shown in FIGS. 2 and 3.

FIGS. 2, 3 and 4 show a preferred embodiment of the present invention. In these figures the same reference numbers have been used as in FIG. 1 to indicate corresponding elements, so as to facilitate comprehension of the present invention.

The chassis or frame of the machine is indicated with number 46.

The group for moving the table 8 may be described as follows. The guide bars 22 and 22' are fixed rigidly to supports 24 and 24', respectively, of the chassis 46. Table 8 is supported by bars 22 and 22' by means of sliding bearings indicated schematically at 48, 50. The bearings 48,50 are connected rigidly by means of clamps 54,54' to beams 56,56' on which the frame of table 8 is mounted. The upper surface of table 8 has a series of parallel slots for passage of the conveyor belts, and the series may assume a raised or lowered position with respect to the table, as described below. Sliding bearings 48 are rigidly connected to the other side with hydraulic cylinder 6, which slides along the rod 16 fixed rigidly to the frame by means of supports 20,20'.

The electrohydraulic amplifier 32 is fixed to the base 46 and, as shown better in FIG. 3, comprises an electric step motor 36 and a hydraulic regulator 34.

FIG. 3 shows how the stroke of cylinder 6 from the position shown in the figure, to the end of its stroke to the left, carries the table 8 rigidly connected to it through a trajectory under the cutting head 4.

Figure 5:
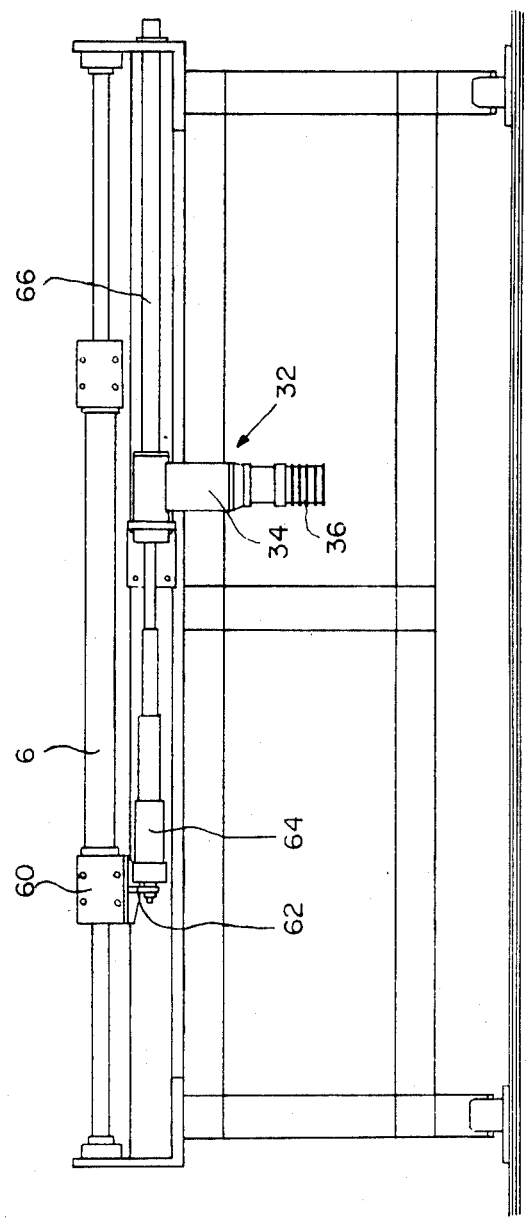
FIG. 5 is a partial view analogous to FIG. 3 which shows the movement of the table in a different position, with the telescopic case for the rack partially elongated.

One head 60 of cylinder 6 is fitted by means of a clamp 62 with a telescopically extensible cover 64, the other end of which is fixed to the regulator 34. From the other end of regulator 34 extends a tube 66 fixed to the support 20', replacing the rod 16. The function of cover 64 and tube 66 is shown more clearly in FIG. 5. On the inside of cover 64 and tube 65, there is a rack (indicated with 40 in FIG. 1) which is fixed to the end of cover 64 attached to the head 64 of cylinder 6. The rack, comprising a metal bar or rod with a toothed surface, is contained in the cover, passes through the regulator 34 meshing with the pinion gear of the regulator (not shown) and continues on the inside of tube 66, with its other end free. Therefore, although it is not shown in the figure, it is clear that the rack fixed to cylinder 6 slides on the inside of regulator 34 as a function of the displacement of cylinder 6, in the stroke end shown in FIG. 3, it is almost entirely inside tube 66. During the piston 6 stroke, the rack remains inside the telescopic cover 64 and so is protected from the external environment.

The hydraulic group for moving the cutting head 4 may be described as follows.

The group is supported by posts fixed to the chassis 46, among which there is a support beam 70 (FIG. 3). Electrohydraulic amplifier 26 is mounted on said beam, which also supports a tempered steel guide shaft 72 for support of the cylinder 2, as well as another shaft 74 for support of the cutting head group. Both cylinder 2 and cutting head 4 are supported by respective shafts 72 and 74 by means of sliding bearings, particularly ball bushings, one of which is indicated as an example with 76 in FIG. 2. The cutting head 4 with wheel 42 which forms the cutting tool is integral to cylinder 2 by means of a hull indicated generally with 78. Therefore the movable member of the group for moving the cutting tool comprises the cylinder 2, the hull 78, the cutting head 4 and the respective sliding bearings on support bars 72 and 74, the rest of the mechanical structure and the devices which provide the motion being fixed to the chassis. In this way, as stated above, the movable group moves only in the axial direction and is relatively light.

Although it is not shown in the figures, the cylinder 2 is fitted with a rack (corresponding to the rack 38 inidcated in FIG. 1) which passes through the regulator 28 in correspondence with the opening indicated with 80. The placement and functioning of the rack for the electrohydraulic amplifier group 26 are completely analogous to that described for the rack 40 for the electrohydraulic amplifier 32, and so they seem clear enough to an expert in this field that they require no graphical representation. In any case, in FIG. 4 the rack 38 is shown connected by means of a clamp 82 to the head 84 of cylinder 2, with the cover of the rack not shown.

It should be noted that while the structure described for the group for moving the cutting head is very light, it is very strong and offers every guarantee of dimensional stability, since the rod 12 of cylinder 2 need not support the weight of the cylinder itself.

The system for moving the glass into working position on table 8 may be described as follows.

Figure 6:
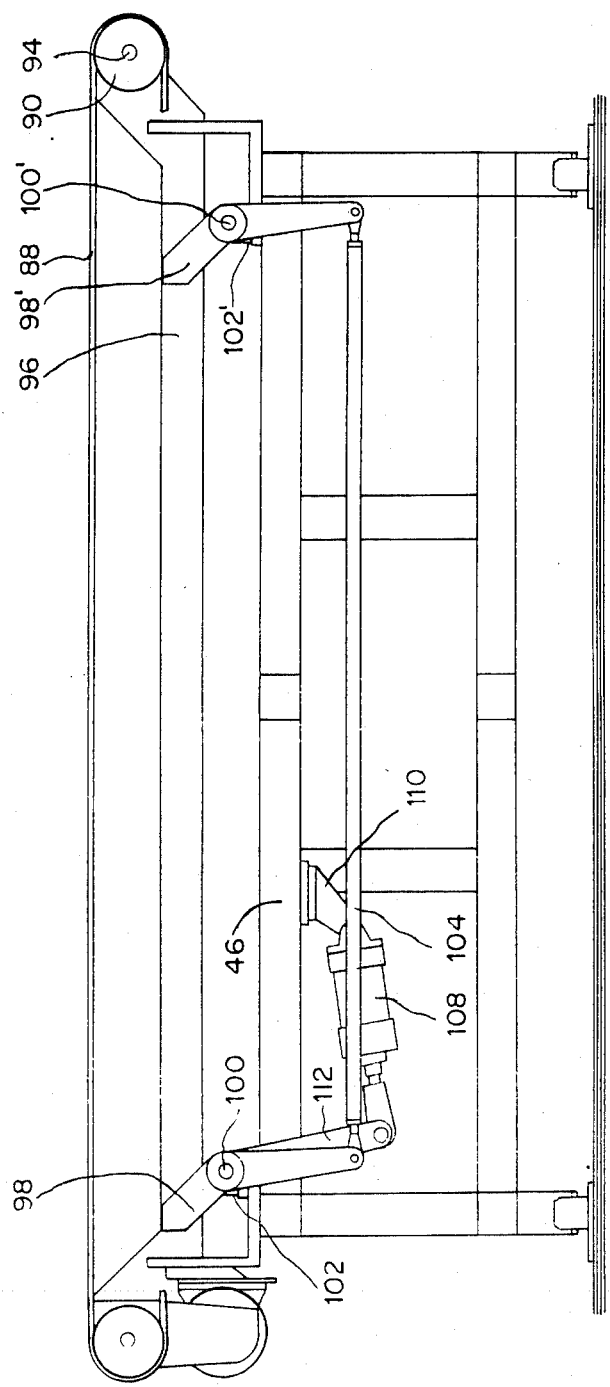
FIG. 6 is a partial view analogous to that in FIG. 3 which shows the link mechanism for the conveyor system.

The conveyor system comprised a belt conveyor 86 sliding on sheaves 88,90 supported by two shafts 92 and 94, respectively. Shafts 92 and 94 are supported by a frame 96, which is in turn supported as shown in detail in FIG. 6, by levers 98,98' fitted on shafts 100,100', which are supported by the chassis 46, but can freely rotate inside their supports 102,102'. The levers extend down, and since at least two of them couple by means of a connecting road 104, they serve as parallel linkages pivoted on the chassis through shafts 100,100'. Rotation of the shafts thus raises or lowers frame 96, so raising of lowering the complex of sheaves 90 and belts 88, possibly together with their motor indicated with 106.

A pneumatic cylinder 108 is provided to effect this movement automatically, which in the embodiment illustrated is suspended to chassis 46 by means of a clamp 110, while its shaft is connected to a linked arm fitted rigidly to shaft 100.

In this way the cylinder 108 may be operated by automatic control to raise the conveyor belts 88 above the level of table 8 when a sheet of glass must be brought on the table or when a cut sheet must be removed; the belts 88 are lowered below the plane of the table to deposit the sheet on it and to allow said table to be moved during the cutting operation. As already stated, table 8 has a series of slots 58 through which the belts 88 may be raised or lowered.

With regard to the cutting head 4, it may be of the type which has a cutting tool which is lowered by and electro-valve (not shown) which shoots pressurized air into a chamber on the inside of the cutting head.

It should be noted that the cutting wheel 42 is off-centre with respect to the axis of rotation of the tool itself, so that the wheel may follow its trajectory with no undesired oscillations to compromise the quality of the cut.

The electro-valve cited above for emiting compressed air to lower the cutting tool, also may be instructed to open a pneumatic valve for sending a suitable lubrifier on the cutting tool itself. When the operation is completed, the electro-valve closes and a return spring brings the cutting head back to its rest position, closing at the same time the outlet for the lubrifier.

Preferably, the apparatus according to the invention also includes a series of abutments 114 which can swing about a shaft 116 so as to be in lowered position when the glass is being moved by the conveyor belts 88 and to be raised, as shown in FIG. 3, automatically to a position for exact abutment of the glass to be cut.

These movements may also be controlled automatically.

While the invention has been described in considerable detail, it is obvious that an expert in the field may effect modifications and variations, which still however remain within the scope of the present invention.

I claim:

1. Apparatus for cutting sheets of plate glass according to a programmed profile, used particularly for automobile windows, comprising in combination:
   a chassis;
   a first piston rod fixed to said chassis, with a first hydraulic piston fixed to it;
   a first cylinder in hydraulic and sliding engagement with said first rod and said first piston;
   a first hydrodynamic control device fixed to the chassis, which hydrodynamically controls the sliding movement of said first cylinder;
   a cutting head fixed to said first cylinder for cutting a sheet of plate glass;
   at least two guide bars disposed perpendicular to said first piston rod and fixed to the chassis;
   a table, sliding on said guide bars in a direction perpendicular to said first piston rod, for supporting on its surface the sheet of glass in a position enabling engagement with said cutting head for a cutting operation;
   a second piston rod fixed to the chassis and parallel to said guide bars, having a second hydraulic piston fixed to it;
   a second cylinder in sliding and hydraulic engagement with said rod and said second piston, and connected rigidly to said table; and
   a second hydrodynamic control device which controls the sliding movement of said second cylinder, so that coordinated commands for the movements of said first and second cylinders, by means of said first and respectively second hydrodynamic control device, effect a cut of the glass according to the desired profile.

2. Apparatus according to claim 1, in which said first and second hydrodynamic control devices are electrohydraulic amplifiers controlled by a digital control unit and comprise respectively an electric step motor controlled electrically by said unit, a hydraulic slide valve controlled by said motor, which regulates the entrance and outlet of fluid for the hydrodynamic control of the movements of said cylinder, and a rack in a gear engagement with said slide valve, which apparatus is characterized by the fact that said rack is engaged rigidly with said cylinder, so that the instantaneous position of the cylinder is in a univocal relationship with the position of said motor, said position supplying feed-back information to the control unit on the exact position of the cylinder.

3. Apparatus according to claim 1, in which said first cylinder is supported on a guide bar integral with a beam fixed to the chassis, coupled by means of sliding bearings, and said cutting head is supported also by said beam through a further guide bar fixed to said beam and coupled with said head by means of sliding bearings, said head being rigidly connected to the cylinder by means of a hull.

4. Apparatus according to claim 1 in which said rack is fixed at one end in a telescopically extensible cover, which is fixed at one end to one end of the cylinder and at the other end to said electrohydraulic amplifier, said rack being free at its other end and guided inside a tube fixed at one end on said electrohydraulic amplifier and at the other on the chassis, the latter end being closed so that said rack is always protected from the external environment.

5. Apparatus according to claim 1, further comprising a conveyor belt to carry the sheet of glass onto the table, which can be raised or lowered with respect to the level of the table, said table having slots for the passage of said conveyor belts, said conveyor being supported rigidly on pairs of levers fitted to respective shafts, which are pivotally connected to the chassis, at least one of said pairs of levers being connected by means of a connecting rod, so that they form a parallel linkage system, and a motor being provided to move one of said shafts angularly to place the conveyor in one of said two positions.

6. Apparatus according to claim 2, in which said digital control unit sends outputs to the two step motors, through an incremental or absolute programming received as an input signal based on the trajectory to be followed.

* * * * *